United States Patent [19]

Lindstol, deceased

[11] Patent Number: 4,681,683

[45] Date of Patent: Jul. 21, 1987

[54] LAMELLA GRAVITY SEPARATOR

[75] Inventor: Anders Lindstol, deceased, late of Oakville, Canada, by Eva Lindstol, administratrix

[73] Assignee: Ecodyne Limited, Oakville, Canada

[21] Appl. No.: 905,703

[22] Filed: Sep. 9, 1986

[30] Foreign Application Priority Data

Oct. 9, 1985 [CA] Canada .................................. 494171

[51] Int. Cl.⁴ .......................................... B01D 17/028
[52] U.S. Cl. .................................... 210/521; 210/802; 210/803
[58] Field of Search ............... 210/519, 521, 522, 802, 210/803

[56] References Cited

U.S. PATENT DOCUMENTS

| | | | |
|---|---|---|---|
| 2,369,194 | 2/1945 | Weber | 210/519 |
| 3,963,624 | 6/1976 | Henderson et al. | 210/521 |
| 4,290,898 | 9/1981 | von Hagel et al. | 210/522 |
| 4,346,005 | 8/1982 | Zimmerman | 210/521 |

FOREIGN PATENT DOCUMENTS 2039873 8/1980 United Kingdom ................ 210/522

Primary Examiner—Richard V. Fisher
Assistant Examiner—Richard D. Jordan
Attorney, Agent, or Firm—Dressler, Goldsmith, Shore, Sutker & Milnamow, Ltd.

[57] ABSTRACT

A lamella separation apparatus comprising a liquid receiving tank defining an upper sedimentation zone, an intermediate quiescent zone and a lower sludge thickening zone. An outlet trough spans the full length of the tank within the sedimentation zone. An inlet distribution trough spans the full length of the tank and is positioned below the outlet trough. A plurality of lamella plate pack/collector trough assemblies are positioned within the sedimentation zone in transverse orientation with and in communication with the inlet and outlet troughs. The plate pack/collector trough assemblies are individually removable without disturbing the operation of the apparatus. A picket fence sludge thickener rake mechanism is provided in the sludge thickening zone.

11 Claims, 9 Drawing Figures

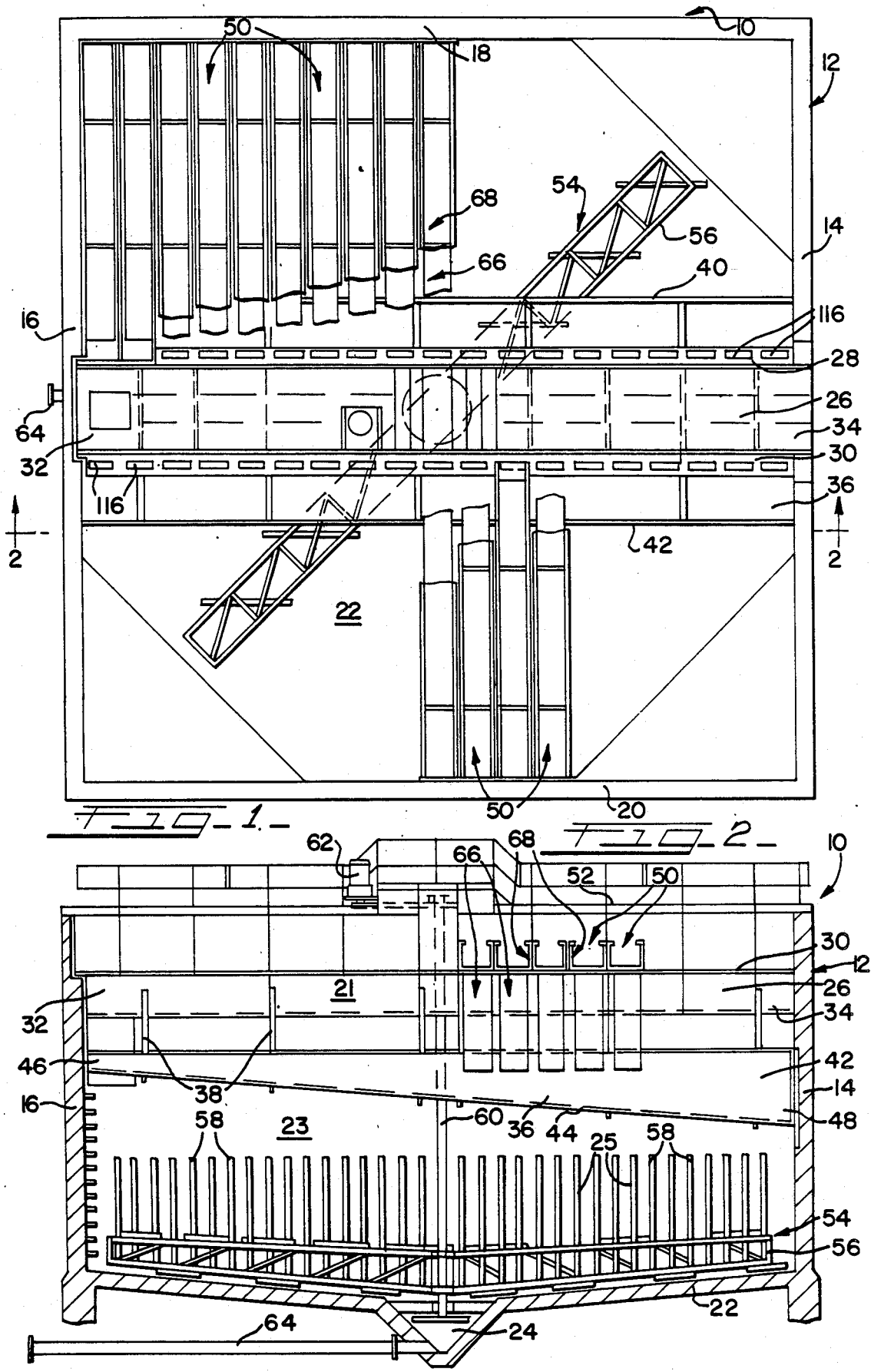

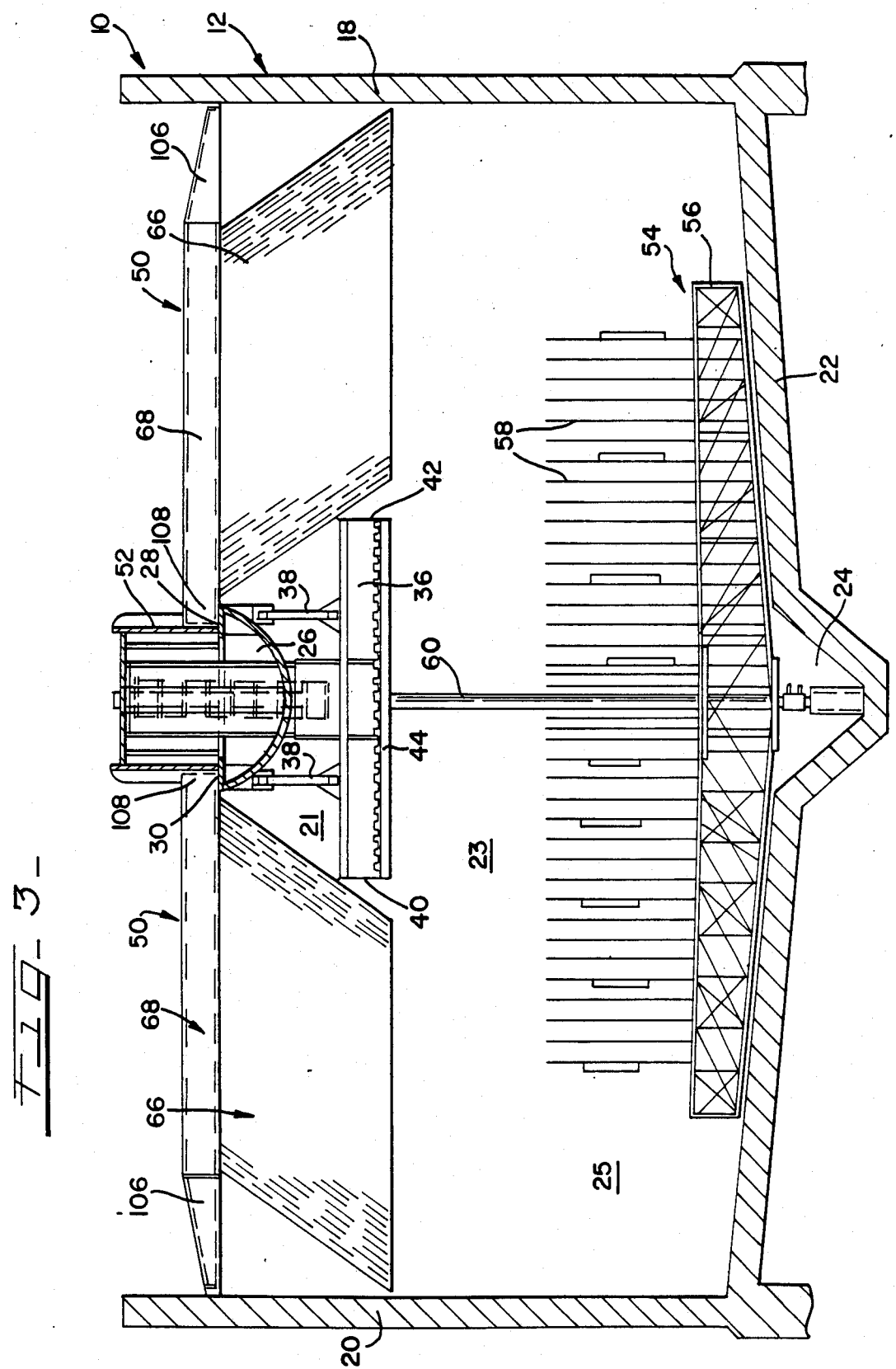

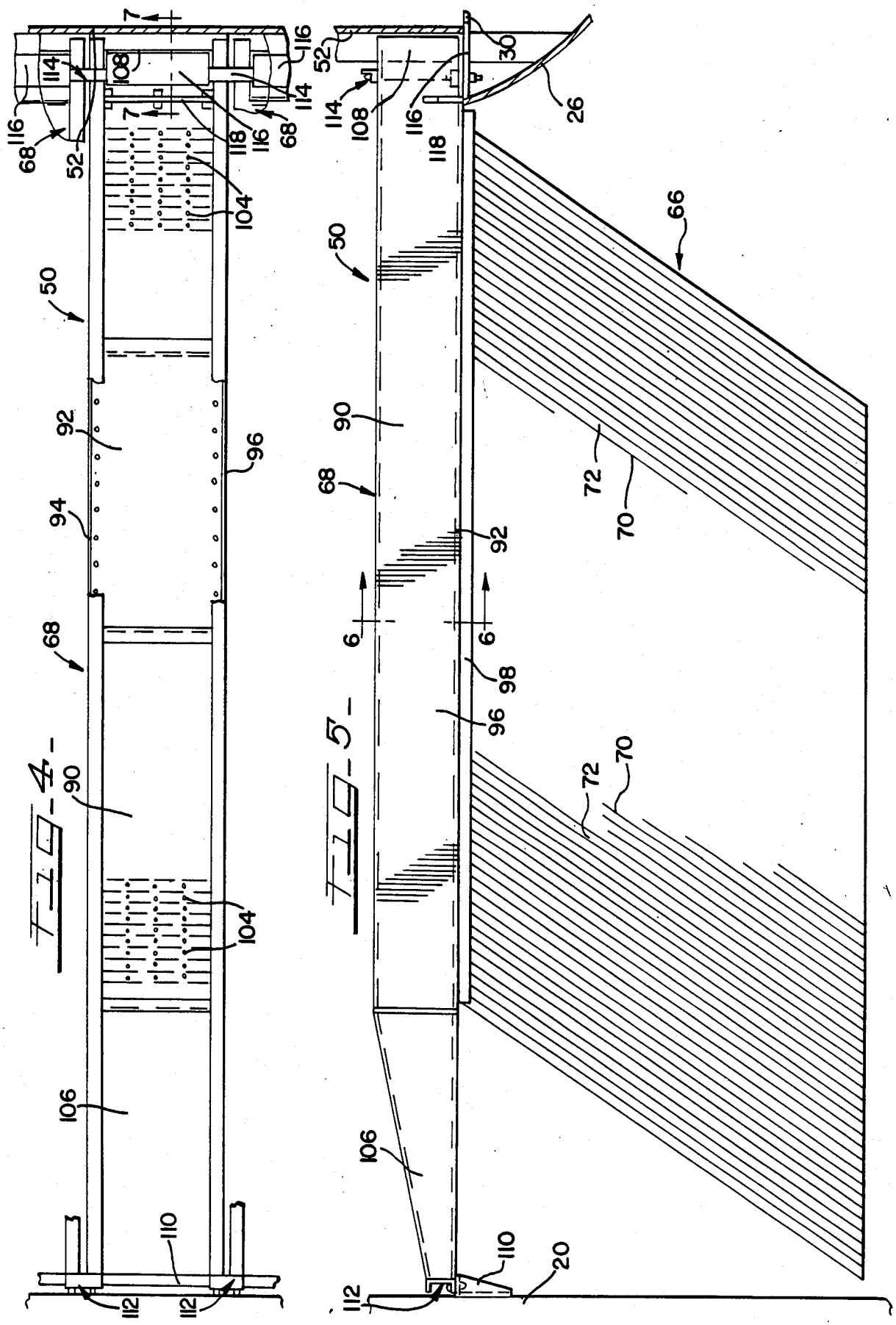

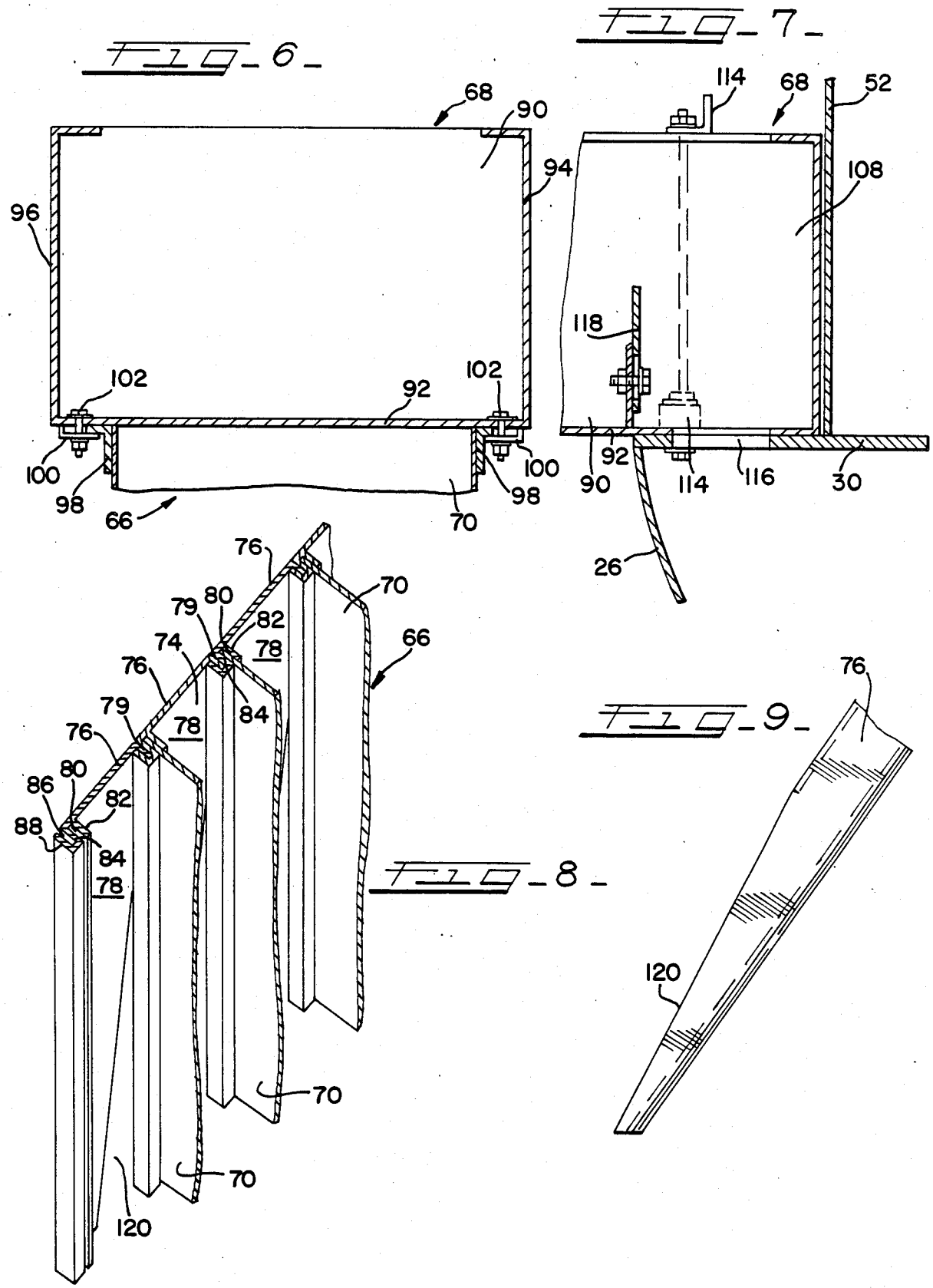

4,681,683

LAMELLA GRAVITY SEPARATOR

BACKGROUND OF THE INVENTION

The present invention generally relates to gravity settling and sludge thickening apparatus and more specifically to an improved lamella type gravity separator and sludge thickener apparatus.

Sedimentation basins and clarifiers have been used for many years to separate solids suspended in water and wastewater. They started out as simple concrete or steel tanks where water containing suspended solids flowed in, was retained for a predetermined length of time, and departed, substantially free of suspended solids. Various advancements were made over the years to increase the efficiency of such apparatus; including the incorporation of sludge removal mechanisms, floculators and sludge recycle mechanisms. More recently, inclined tube settlers of various designs have been installed in such apparatus to increase the surface loading rate.

In recent years the separation art has directed much attention to lamella separation. Lamella separation separates solids from a carrying liquid by directing the liquid between series of inclined plates (lamellae). The effective settling area of each lamella plate is equivalent to the horizontal projection of that lamella plate. Lamella plates are typically spaced a few inches apart with the result that large settling surfaces are concentrated within a relatively small area. The separated particles settling on the inclined lamella plate slide down into a sludge hopper area below the lamella plates. The lamella separation promotes laminar and stable flow conditions throughout the apparatus, which leads to a very high degree of separation.

Lamella separator apparatus are classified into three main categories based on flow regimes in the unit; namely (1) counter-current, wherein the suspension and the liquid flows are counter-current to the sludge flow; (2) concurrent, wherein the suspension and the liquid flow are concurrent to the sludge flow; and (3) cross-current, wherein the suspension and the liquid flow are at right angles to the sludge flow. As the art has developed, it has been generally recognized that the counter-current flow regime is the best as well as the least expensive both in installation and operation.

In optimizing the design of lamella separator apparatus, there are many design variables which cooperate with one another in determining the efficiency and reliability of the apparatus. These variables include the cooperation between the inlet and outlet assemblies and the lamella plate assemblies. In optimizing these variables, it is desirable to maximize effective use of the projected lamella area while preventing sludge that has already settled from being reentrained in the liquid flow. Further, in order to maximize utilization of the lamella settling surfaces and achieve the greatest possible efficiency, it is important that each lamella flow passage be given a substantially equal hydraulic load.

Another important consideration which must be addressed in designing a lamella separator unit is the ability to maintain the apparatus. Experience has indicated that it is periodically necessary to perform maintanance to the lamella plates and/or to replace them. Accordingly, it is desirable to be able to perform such maintenance and/or replacement without materially interfering with the operation of apparatus.

Examples of heretofore proposed designs of lamella separator apparatus are disclosed in U.S. Pat. Nos. 3,552,554, 3,706,384, 3,894,955 and 4,290,898. The present invention is directed to improve upon the operational efficiency and the maintenance of such designs

SUMMARY OF THE INVENTION

The lamella separation apparatus in accordance with a preferred embodiment of the invention includes a liquid receiving tank defined by sidewalls and a floor. A central elongated inlet distribution trough, having a closed bottom and sides and an open top, spans the full length of the tank. An elongated outlet trough spans the full length of the tank and is positioned above the inlet distribution trough. A plurality of lamella plate packs are positioned within the tank in transverse orientation to the inlet trough and the outlet trough. An elongated collector trough is secured to each plate pack in closing relationship to the upper portion thereof. The collector trough is defined by upstanding sidewalls and a floor, which floor extends across the tops of the lamella plates. A plurality of openings are formed in the floor to communicate with the flow passages defined in the plate pack.

Each collector trough and plate pack form an assembly which may be individually removed from the tank without disrupting the operation of the apparatus. The collector trough has a first end portion which is releasably secured to a sidewall of the tank and a second end portion which communicates with and is releasably secured to the outlet trough. . An outlet opening is formed in the floor of the collector trough adjacent the second end portion thereof in communication with the outlet trough. An adjustable weir is transversely positioned within the collector trough adjacent the second end portion thereof to selectively control the liquid level in the collector trough.

In accordance with a preferred embodiment of the invention, the lamella plate pack is defined by sidewalls between which a plurality of spaced apart, inclined, parallel, plates extend so as to define flow passages therebetween. The sidewalls are formed by a plurality of interconnected panel members. The panel members are formed so as to define an elongated plate receiving recess for receipt of an edge portion of a corresponding plate. The panel members are further formed with an inwardly extending leg along one edge thereof and a connecting leg recess formed along the other edge thereof for receipt of a connecting leg of an adjacent panel member. The lower portion of the panel members are cut-away for receipt of liquid to be treated therethrough and directing same into the flow passages.

A quiescent sludge settling zone is defined below the plate packs for receipt of the sludge leaving the plate packs. A picket fence sludge thickener rake mechanism is provided in a lower portion of the tank to further thicken the sludge.

BRIEF DESCRIPTION OF THE DRAWING

FIG. 1 is a top plan view of a lamella separator apparatus constructed in accordance with the present invention, with certain portions cut away for clarity.

FIG. 2 is a sectional elevation view taken along line 2—2 in FIG. 1.

FIG. 3 is an enlarged sectional elevation view similar to FIG. 2, but taken at a ninety degree orientation thereto, with certain parts removed for clarity.

FIG. 4 is an enlarged top plan view of a collector trough and plate pack assembly constructed in accor- FIG. 5 is an elevational view of the collector trough and plate pack assembly as shown in FIG. 5.

FIG. 6 is an enlarged sectional view taken along line 6—6 in FIG. 5.

FIG. 7 is an enlarged sectional view taken along line 7—7 in FIG. 4.

FIG. 8 is a perspective view of a portion of the lamella plate pack constructed in accordance with the present invention.

FIG. 9 is an elevational view of a lower portion of a side panel constructed in accordance with the present invention.

DESCRIPTION OF A PREFERRED EMBODIMENT

Referring to FIGS. 1-3, the lamella type gravity separator and sludge thickener apparatus 10, in accordance with a preferred embodiment of the invention, comprises a liquid receiving basin or tank 12 consisting of sidewalls 14, 16, 18, and 20 and a floor 22. Floor 22 is inclined inwardly from the sidewalls towards a sludge pit 24 centrally formed in the floor. Tank 12 has an upper sedimentation zone 21, an intermediate quiescent zone 23 and a lower sludge thickening zone 25.

A centrally disposed elongated outlet trough 26 spans the full length of tank 12 between sidewalls 14 and 16 and is suitably supported in sedimentation zone 21. Outlet trough 26 is semi-circular in cross-section and is open at its upper end. Longitudinally extending flanges 28 and 30 extend inwardly from the respective upper edges thereof, as best seen in FIG. 3. Trough 26 has a closed first end 32 and an open second end 34, which second end is in communication with a clear water effluent conduit (not shown).

A centrally disposed elongated inlet distribution trough 36 spans the full length of tank 12 between sidewalls 14 and 16 in sedimentation zone 21. As best seen in FIG. 3, inlet trough 36 is suspended from outlet trough 26 by suitable support members 38 and is accordingly positioned directly therebelow. Trough 36 is defined by upstanding sidewalls 40 and 42 and a floor 44 and has a closed first end 46 and an open second end 48 which communicates with a source of liquid to be treated (not shown). Floor 44 is preferably inclined upwardly from the second end 48 towards the first end 46, as best seen in FIG. 2.

A plurality of elongated plate pack/collector trough assemblies 50 are supported within sedimentation zone 21 in a transverse orientation to troughs 26 and 36. Assemblies 50 extend from sidewalls 18 and 20 respectively to a corresponding flange 28 and 30 and are positioned in a side by side orientation on either side of troughs 26 and 36. The specific construction of assemblies 50 in accordance with the present invention will be hereinbelow described in further detail.

A suitable support bridge structure 52 extends across the upper edges of tank 12. A sludge scraper arm assembly 54, of well known construction, is rotatably mounted in sludge thickening zone 25. As best seen in FIGS. 2 and 3, sludge scraper arm assembly 54 includes a scraper arm 56 having upstanding thickeners 58 secured thereto. Scraper arm 56 is attached to a centrally disposed rotating shaft 60 having a lower end extending into sludge pit 24 and an upper end extending upwardly towards support bridge 52. Shaft 60 is suitably rotated by a scraper drive mechanism indicated at 62. A sludge take-off conduit 64 communicates with sludge pit 24 for withdrawing thickened sludge therefrom.

Referring to FIGS. 4-9, the plate pack/collector trough assemblies 50 in accordance with the present invention comprise a plate pack assembly 66 and a collector trough assembly 68. Plate pack assembly 66 includes a plurality of inclined, parallel plates 70 defining flow passages 72 between. Plates 70 extend between a pair of spaced apart upstanding parallel sidewalls 74. Sidewalls 74 are constructed of interconnected inclined panel members 76. Panel member 76 is formed so as to define planar surface 78 having an inwardly extending connecting leg portion 79 formed adjacent one edge thereof. The other edge of planar surface 78 is formed so as to define an elongated plate receiving recess 80, defined between inwardly extending spaced apart leg portions 82 and 84, and an elongated connecting leg receiving recess 86, defined between leg portion 84 and a leg portion 88. As best seen in FIG. 8, the edges of plates 70 are received in recesses 70 and the leg portions 79 are received in recesses 86 of adjacent panel members. Panel members 76 are preferably extruded from a suitable plastic material. Likewise, plates 70 are preferably fabricated from a suitable plastic or metallic material. Although not shown in the drawings, the outer edges of plates 70 may be formed with outwardly extending projections to be retained by cooperating projections formed in recess 80. Also, the outer edge of leg portion 88 may be formed with a projection to be retained by a cooperating projection formed in recess 86. This modular type of construction of plate pack assembly 66 facilitates fabrication of plate pack assemblies of varying widths and lengths.

Referring to FIGS. 4-7, collector trough assembly 68, in accordance with a preferred embodiment of the invention, is defined by an elongated collector trough 90 having a floor 92 and sidewalls 94 and 96. As best seen in FIG. 6, the floor 92 extends beyond and is secured to plate pack assembly 66 in covering relationship to the upper portion thereof. Elongated angle members 98 are suitably secured to sidewalls 74 and to floor 92 through clip members 100 and fasteners 102 so as to rigidly secure plate pack assembly 66 to collector trough assembly 68. Floor 92 is formed with a plurality of orifices 104 formed therein which communicate with corresponding flow passages 72, as best seen in FIG. 4.

Collection trough 90 has a first end portion 106 releasably secured to either sidewall 18 or 20 and a second end portion 108 releasably secured to either flange 28 or 30 of outlet trough 26. Referring to FIGS. 4 and 5, end portion 106 rests on support brackets 110 suitably secured to sidewalls 18 and 20 and is releasably secured thereto in a conventional manner, as by hold-down clip and positioning assemblies 112. Referring to FIGS. 4, 5 and 7, end portion 108 rests on a corresponding flange 28 or 30 and is releasably secured thereto in a conventional manner, as by hold down clip and positioning assemblies 114. As best seen in FIG. 7, the floor of end portion 108 and the flanges 28 and 30 have corresponding openings 116 formed therein to permit communication between end portion 108 of collection trough 90 and outlet trough 26. Referring to FIGS. 4, 5 and 7, an adjustable weir assembly 118 extends upwardly from floor 92 across collection trough 90 adjacent end portion 108 for selectively controlling the liquid level in trough 90 in a well known manner.

Referring to FIGS. 1-3, a plurality of plate pack/collector trough assemblies 50 are positioned in sedimentation zone 21 in side by side relationship, spaced apart by a short distance, between sidewalls 14 and 16. As best seen in FIG. 3, the upper edge of inlet distribution trough 36 is in sealing contact with the adjacent end plates of the plate packs 66 so as to cause inlet liquid from inlet trough 36 to flow into the space between the plate packs. Referring to FIGS. 8 and 9, the lower portions of panel member 74 are cut-away as indicated at 120, through which cut-away portions inlet liquid enters the lower portions of flow passages 72.

In operation, the liquid containing suspended solids to be treated is directed into inlet distribution trough 36 from which it uniformly flows through cut-away portions 120 on either side of the plate packs 66 into the lower portions of flow passages 72 defined in the plate packs. As is well known in counter-current lamella sedimentation, as the liquid passes upwardly through passages 72 settling of suspended solids on the plates 70 takes place. The liquid continues to flow upwards while the settled solids move down the surface of the plates. The clarified liquid passes through orifices 104 into collector trough 90 and the settled solids exit flow passages 72 and pass through quiescent zone 23 into sludge thickening zone 25. The settled solids are thickened in zone 25 by scraper arm assembly 54 in a well known manner and directed into sludge pit 24, from which it is periodically removed through conduit 64.

The clarified liquid passes through orifices 104 into collector troughs 90 and collects therein to a level dependent upon the height of the upper edges of adjustable weirs 118. In accordance with the preferred embodiment of the invention, each flow passage 72 has a plurality of spaced apart submerged orifices in communication therewith which assures even flow distribution through each passage. The clarified liquid in collector troughs 90 passes over weirs 118 into the end portion 108 thereof and through openings 116 into outlet trough 26 from which it is removed from tank 12.

As alluded to hereinabove, it is periodically necessary to perform maintenance on the plate packs 66, such as the cleaning or replacement of plates 70. The apparatus of the present invention permits removal of an individual plate pack/collector trough assembly 50, upon suitably closing off the corresponding opening 116, without interfering with the operation of the remainder of the system. This is accomplished by releasing the corresponding hold down clip and positioning assemblies 112 and 114 and lifting the assembly 50 from tank 12. Since the collector troughs 90 are not in series, the removal of one or more assemblies 50 does not effect the operation of the other assemblies 50.

The preferred embodiment of the invention as described hereinabove shows but one form thereof. It will be obvious to those skilled in the art that it is not so limited, but is susceptible of various changes and modifications without departing from the spirit thereof as defined in the appended claims.

What is claimed is:

1. Apparatus for separation of solids suspended in a liquid, comprising:
    (a) a liquid receiving basin;
    (b) a plurality of plate packs positioned within said basin, said plate packs including a plurality of inclined parallel plates therein defining a plurality of parallel inclined flow passages therebetween;
    (c) an inlet distribution means for directing liquid to be treated into said basin and upwardly through said flow passages;
    (d) an elongated collector trough means secured to each of said plate packs in covering relationship to the upper portions thereof, said collector trough means having a floor and upstanding sidewalls, said floor having means defining a plurality of orifices formed therein in communication with said flow passages for directing clarified liquid upwardly therethrough into said collector trough means;
    (e) an elongated outlet trough means extending transversely with respect to said collector trough means for receiving clarified liquid from said collector trough means and directing same from said basin wherein said collector trough means has an outlet opening formed therein in fluid communication with said outlet trough means ; and
    (f) said collector trough means having first end portions releasably secured to a sidewall of said basin and second end portions releasably secured to said outlet trough means such that each collector trough means and corresponding plate pack may be individually removed from said basin.

2. The apparatus as defined in claim 1 wherein said second end portions of said collector trough means have the outlet opening formed therein.

3. The apparatus as defined in claim 2 wherein said outlet trough means is positioned within said basin.

4. The apparatus as defined in claim 3 wherein said collector trough means has an adjustable weir means extending between the sidewalls thereof for controlling the liquid level therein, said weir means being positioned inwardly of said outlet ooening.

5. The apparatus as defined in claim 1 wherein said inlet distribution means is an inlet distribution trough means positioned within said tank extending transversely with respect to said packs and is suspended from and is positioned below said outlet trough means.

6. The apparatus as defined in claim 1 wheren said plate packs have sidewalls between which said parallel plates extend.

7. The apparatus as defined in claim 6 wherein said sidewalls being formed by a plurality of interconnected panel members.

8. The apparatus as defined in claim 7 wherein each of said panel members have a plate receiving recess formed therein for receipt of an edge portion of a corresponding plate.

9. The apparatus as defined in claim 8 wherein each of said panel members have an inwardly extending connecting leg formed along one edge thereof and a connecting leg recess formed along the other edge thereof for receipt of a connecting leg of an adjacent panel member.

10. The apparatus as defined in claim 7 wherein the upper portions of said panel members are secured to a corresponding collector trough means.

11. The apparatus as defined in claim 7 wherein portions of the lower portions of said panels are cut-away for directing the liquid to be treated therethrough into said parallel flow passages.

* * * * *